US008911670B2

(12) United States Patent
Wang et al.

(10) Patent No.: US 8,911,670 B2
(45) Date of Patent: Dec. 16, 2014

(54) LED ACTIVATED PHOTOCATALYST AIR FILTER

(75) Inventors: Li Wang, Shanghai (CN); Xuanbin Liu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 253 days.

(21) Appl. No.: 13/197,428

(22) Filed: Aug. 3, 2011

(65) Prior Publication Data

US 2013/0034470 A1  Feb. 7, 2013

(51) Int. Cl.
*A62B 7/08* (2006.01)
*B01D 53/86* (2006.01)
*B01D 53/88* (2006.01)

(52) U.S. Cl.
CPC ...... *B01D 53/8668* (2013.01); *B01D 2259/804* (2013.01); *B01D 2255/802* (2013.01); *B01D 2259/802* (2013.01); *B01D 53/88* (2013.01); *B01D 2258/06* (2013.01); *B01D 2257/708* (2013.01)
USPC ............................ 422/121; 422/120; 422/122

(58) Field of Classification Search
CPC ............. B01D 29/0013; B01D 33/015; B01D 33/0183; B01D 2321/343
USPC ....................... 422/5, 120, 121, 122
See application file for complete search history.

(56) References Cited

U.S. PATENT DOCUMENTS

| 5,523,057 | A  | * | 6/1996  | Mazzilli ........................ 422/121 |
| 5,919,422 | A  | * | 7/1999  | Yamanaka et al. ............ 422/121 |
| 6,716,406 | B2 | * | 4/2004  | Reisfeld et al. ............ 423/245.1 |
| 6,803,939 | B2 |   | 10/2004 | Shimizu et al. |
| 6,955,708 | B1 | * | 10/2005 | Julos et al. ........................ 95/59 |
| 7,163,307 | B1 | * | 1/2007  | Clark et al. ..................... 362/99 |
| 2004/0170537 | A1 | * | 9/2004 | Hara .............................. 422/122 |
| 2008/0083411 | A1 | * | 4/2008 | Guth ........................ 128/206.12 |
| 2009/0064645 | A1 | * | 3/2009 | Mahler ........................... 55/480 |
| 2010/0225251 | A1 | * | 9/2010 | Maruyama .................... 315/307 |
| 2010/0260644 | A1 | * | 10/2010 | Day et al. ...................... 422/121 |
| 2011/0033346 | A1 |   | 2/2011 | Bohlen et al. |
| 2012/0062133 | A1 | * | 3/2012 | Cubias .......................... 315/201 |

FOREIGN PATENT DOCUMENTS

| CN | 201141663   | Y  | 10/2008 |
| JP | 2006026239  | A  | 2/2006  |
| WO | 03/033037   | A1 | 4/2003  |
| WO | 03/086792   | A1 | 10/2003 |

OTHER PUBLICATIONS

Jyoti P. Ghoch, et al., Characterization of an LED Based Photoreactor to Degrade 4-Chlorophenol in an Aqueous Meduim Using Coumarin (C-343) Sensitized TiO2, J. Phys. Chem. A 2008, 112, pp. 10310-10314.

(Continued)

*Primary Examiner* — Regina M Yoo
(74) *Attorney, Agent, or Firm* — Brooks, Cameron & Huebsch, PLLC

(57) ABSTRACT

The present disclosure provides devices and methods for making a light emitting diode (LED) activated photocatalyst air filter. One or more embodiments include a filter material that includes a photocatalyst, and a frame that includes an array of a number of LEDs positioned on the frame to project a wavelength of light directed toward the filter material, wherein the array of LEDs is positioned a distance from the filter material.

7 Claims, 4 Drawing Sheets

(56) References Cited

OTHER PUBLICATIONS

Jyoti P. Ghosh, et al., A comparison of several nanoscale photocatalysts in the degradation of a common pollutant using LEDs and conventional UV light, Science Direct, Water Reasearch, vol. 43 (2009), pp. 4499-4506.

William A. Jacoby, et al., Heterogeneous Photocatalysis for Control of Volatile Organic Compounds in Indoor Air, Journal of the Air & Waste Management Association, vol. 46, Sep. 1996, pp. 891-898.

* cited by examiner

LED ACTIVATED PHOTOCATALYST AIR FILTER

TECHNICAL FIELD

The present disclosure relates to an LED activated photocatalyst air filter.

BACKGROUND

Air filters can be used to remove certain pollutants (e.g., chemical compounds, particles) from the air. To remove particles from the air, an air filter can be constructed with a material that allows air to pass through, but restricts some or all particles. Such a material can include a number of pores that are of a smaller size than the particles to be removed. However, many air filters that can remove particles from the air are not able to remove chemical compounds such as, for example, volatile organic compounds (VOCs) and/or biological contaminants because the size of the molecules that make up the VOCs and/or biological contaminants, referred to generally herein as VOCs, can allow them to pass through a filter material that is designed to remove particles.

In order to remove chemical compounds, some air filters utilize photocatalytic oxidation (PCO). These air filters can employ an ultraviolet (UV) lamp, which directs UV rays on photocatalyst particles to activate the photocatalyst, producing hydroxyl radicals and super-oxide ions that can react with the chemical compounds to turn them into carbon dioxide and water. Challenges can be associated with the use of UV lamps however, because of their increased energy consumption and maintenance associated with their use.

DETAILED DESCRIPTION

Figure 1:
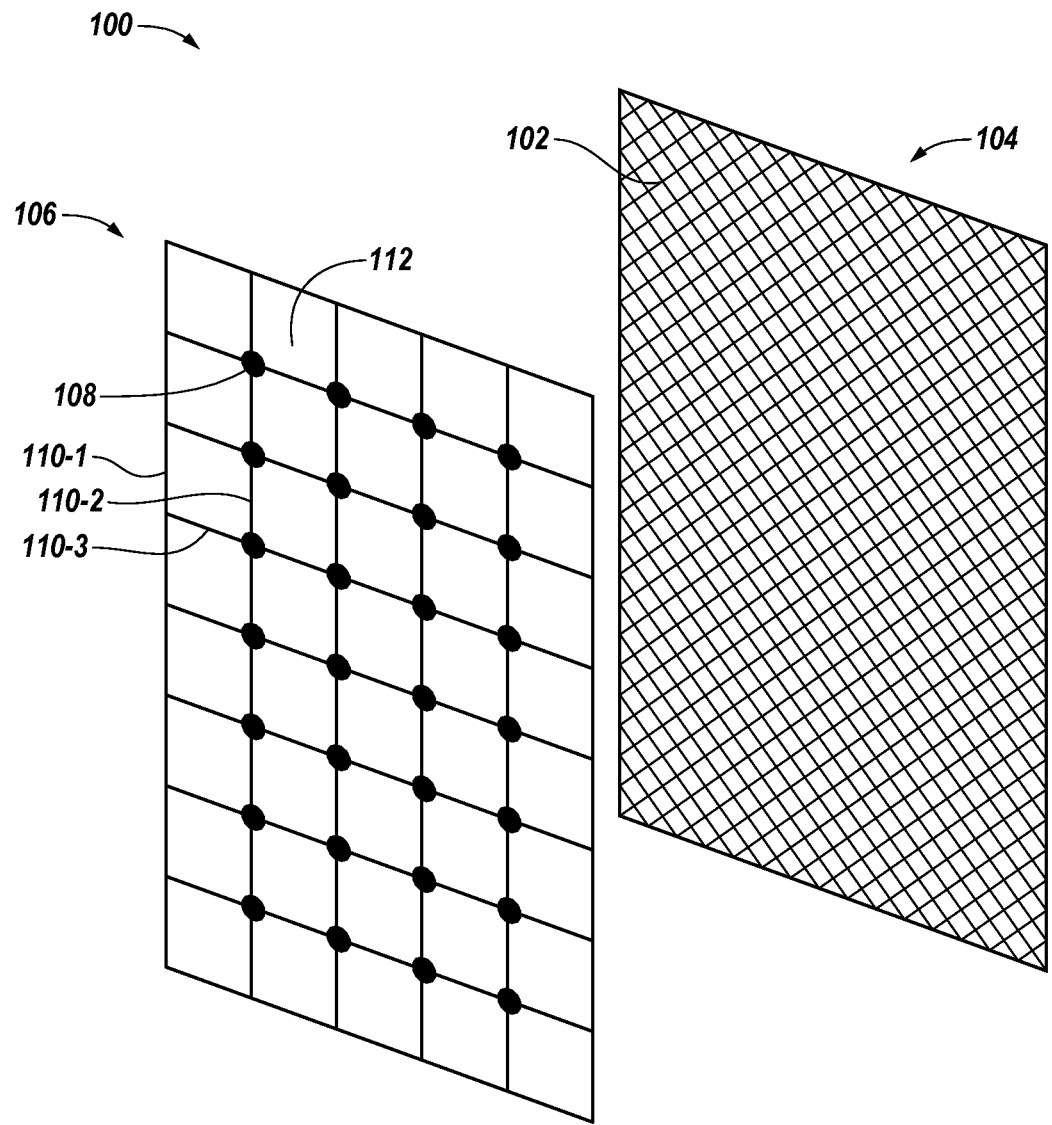
FIG. 1 illustrates an LED activated photocatalyst air filter with a number of LEDs positioned on a frame and a filter material that includes a photocatalyst according to one or more embodiments of the present disclosure.

The present disclosure provides devices and methods for making a light emitting diode (LED) activated photocatalyst air filter. One or more embodiments include a filter material that includes a photocatalyst, and a frame that includes an array of a number of LEDs positioned on the frame to project a wavelength of light directed toward the filter material, wherein the array of LEDs is positioned a distance from the filter material.

Some embodiments of the present disclosure can provide an LED activated photocatalyst air filter that can remove VOCs from a stream of air. VOCs can include, for example, benzene, acetone, chloromethane, styrene, octane, acetaldehyde, formaldehyde, styrene, 2-butanone, and/or methylene chloride, although examples are not so limited.

By exposing the photocatalyst of the air filter to certain wavelengths of UV and/or visible light, a band gap energy of the photocatalyst can be exceeded and an electron can be promoted from a valence band (e.g., a state where electrons are bound to individual atoms) to a conduction band (e.g., a state where electrons are freed from individual atoms). The band gap energy of the photocatalyst can be defined as the amount of energy (e.g., electron volts) required to free an outer shell electron from its orbit to a free state, and thus promoting it from a valence band to a conduction band. Upon promotion of the electron from the valence band to the conduction band, an electron-hole pair can be created, which can form a number of hydroxyl radicals and super-oxide ions. The resulting hydroxyl radicals and super-oxide ions can react with and oxidize VOCs, which have been adsorbed onto the photocatalyst surface, generating carbon dioxide and water, in an example.

Embodiments of the present disclosure can provide an LED activated photocatalyst air filter that can provide generally uniform activation of the photocatalyst. As used herein, activation of the photocatalyst can mean causing the photocatalyst to react in a presence of UV and/or visible light. In an example, embodiments can employ a number of diffusion plates positioned between the array of the number of LEDs and the filter material that includes the photocatalyst. The diffusion plates can increase an angle of divergence of beams of light emitted from LEDs in the array. This can provide a more uniform distribution of light contacting the photocatalyst, which can help to ensure that the photocatalyst is activated generally uniformly.

Various embodiments of the present disclosure can reduce an energy requirement associated with operating the LED activated photocatalyst air filter. In an example, embodiments can use a number of LEDs in an array to project a wavelength of light towards the photocatalyst to activate the photocatalyst. LEDs can have a reduced energy requirement as opposed to other lighting sources (e.g., UV lamps), which can reduce energy requirements associated with the operation of the LED activated photocatalyst air filter.

Alternatively, and/or in addition, embodiments of the present disclosure can reduce the energy requirement associated with operating the LED activated photocatalyst air filter by providing a number of vacancies in the array of LEDs and in an associated diffusion plate. By providing the number of vacancies in the LED array and associated diffusion plate, embodiments of the present disclosure can ensure that air flowing through the LED activated photocatalyst air filter is not restricted, while still providing a generally uniform distribution of light that contacts the photocatalyst.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

As used herein, "a" or "a number of" something can refer to one or more such things. For example, "a number of LEDs" can refer to one or more LEDs.

FIG. 1 illustrates an LED activated photocatalyst air filter according to one or more embodiments of the present disclosure. In various embodiments, the LED activated photocatalyst air filter 100 can be placed in an air cleaner, heating, ventilation, and/or air conditioning system, although examples are not so limited.

The LED activated photocatalyst air filter 100 can include a filter material 102 that includes a photocatalyst. The filter material 102 can be encased in a filter frame 104 to maintain a shape and/or rigidity of the filter material 102 in the LED activated photocatalyst air filter 100. The filter frame 104 can be made from metal, plastic, paper, and/or cardboard, although examples are not so limited. Although the filter frame 104 is illustrated in FIG. 1, various embodiments do not require a filter frame 104. For example, filter material 102 can be fixed in a duct associated with the LED activated photocatalyst air filter 100 by sliding the filter material 102 in a slot located within the duct. Alternatively, and/or in addition, filter material 102 can be fixed in a duct associated with the LED activated photocatalyst air filter 100 by squeezing the filter material 102 between a fixed flange that is located in the duct and a movable flange.

In an example, the filter material 102 can include metal, cloth, plastic, ceramic, and/or paper, although examples are not so limited. The filter material 102 can also include porous materials, which can capture organic gas molecules. Porous materials can include, for example, active carbon, zeolite, porous ceramic, metal foam, cordierite, and/or sponge. To lower a wind resistance of the filter material 102, the filter material 102 can include a number of meshes formed of a regular and/or irregular pattern. A size of holes in the mesh can be chosen to adjust the wind resistance associated with the filter material 102. In an example, wind resistance can be reduced by increasing the size of holes in the mesh and increased by decreasing the size of holes in the mesh.

In various embodiments, the photocatalyst can be ultraviolet light and/or visible light responsive and can include titanium dioxide, zinc oxide, ferric oxide, cadmium sulfide, cadmium selenide, tungsten trioxide, molybdenum trioxide, vanadium pentoxide, tin oxide, and combinations thereof, although examples are not so limited. When titanium dioxide is used as the photocatalyst, a size of the titanium dioxide particles can be less than 50 nanometers (nm). To make the photocatalyst responsive to visible light (e.g., extend a spectral response of the photocatalyst from the UV light range into the visible light range), the photocatalyst can be doped with doping elements which can include iron, chromium, cobalt, molybdenum, vanadium, boron, carbon, nitrogen, sulfur, fluorine, and combinations thereof, although examples are not so limited.

In some embodiments, a coating of the photocatalyst can be applied to the filter material 102. Alternatively, and/or in addition, the filter material 102 can be embedded with the photocatalyst. Depending on what filter material 102 and/or photocatalyst is chosen, a surface of the filter material 102 can be treated to improve adhesion of the photocatalyst and/or prevent oxidation of the substrate by the catalyst. Surface treatment of the filter material 102 can include, for example, cleaning the surface of the filter material 102 with a solvent and/or acid. Alternatively, and/or in addition, surface treatment can include coating a sublayer on the surface of the filter material 102 to improve photocatalyst adhesion and prevent oxidation of the filter material 102 caused by the photocatalyst. In an example, the coating can include silicone dioxide, although examples are not so limited.

In various embodiments, the coating of the photocatalyst can be applied in the form of a powder and/or a film. Methods of coating can include sol-gel, liquid vapor deposition, chemical vapor deposition, thermal decomposition, magnetron sputtering, dip coating, and/or spraying, although examples are not so limited. In an example, dip coating can be performed by forming a solution of the photocatalyst and dipping the filter material 102 in the photocatalyst solution. The filter material 102 can then be taken out of the photocatalyst solution after a period of time and allowed to dry at room temperature and/or heated to a temperature to dry the photocatalyst solution. Coating the filter material 102 in this way can ensure that all of the surfaces of the filter material 102 are coated with the photocatalyst.

The LED activated photocatalyst air filter 100 can include a frame 106 that includes an array of a number of LEDs 108 positioned on the frame to project a wavelength of light directed toward the filter material 102, wherein the array of LEDs 108 is positioned a distance from the filter material 102. The frame 106 can be formed from a metal, a plastic, printed circuit board, and/or any material that can prevent deformation of the frame 106 as air passes past the frame 106. In an example, the frame 106 can be stamped and/or molded from metal and/or plastic. Alternatively, and/or in addition, the frame 106 can be woven from plastic and/or metal to create a mesh.

The frame 106 can include a number of cross members 110-1, 110-2, 110-3 with vacancies 112 between the number of cross members 110-1, 110-2, 110-3. Although cross members 110-1, 110-2, and 110-3 are shown as generally perpendicular to one another, forming vacancies that are in the shape of squares, examples are not so limited. In an example, cross members can be configured to form vacancies that are circular, ovular, triangular, and/or pentagular although examples are not so limited.

By providing vacancies 112 in the frame 106, air flow through the frame 106 can be less restricted because air can be directed around the number of cross members 110-1, 110-2, 110-3, through the vacancies 112. In an example, the number of LEDs 108 can be positioned at a number of intersections of the number of cross members 110-1, 110-2, 110-3, as shown in FIG. 1.

In various embodiments, the number of LEDs 108 can emit UV light. UV light can be defined as electromagnetic radiation that has a wavelength shorter than 400 nm. UV light can have a wavelength in a range of 400-315 nm, 315-280 nm, or 280-200 nm, which can be referred to as UVA wavelengths, UVB wavelengths, and UVC wavelengths, respectively. Alternatively, and/or in addition, the number of LEDs 108 can emit visible light in a range of 400 nm to 780 nm. Selection of a type of LED 108 (e.g., the type of wavelength that a chosen LED 108 emits) can depend on what type of photocatalyst is used and whether the photocatalyst has been doped (e.g., whether the photocatalyst is responsive to UV and/or visible light).

Figure 2A:
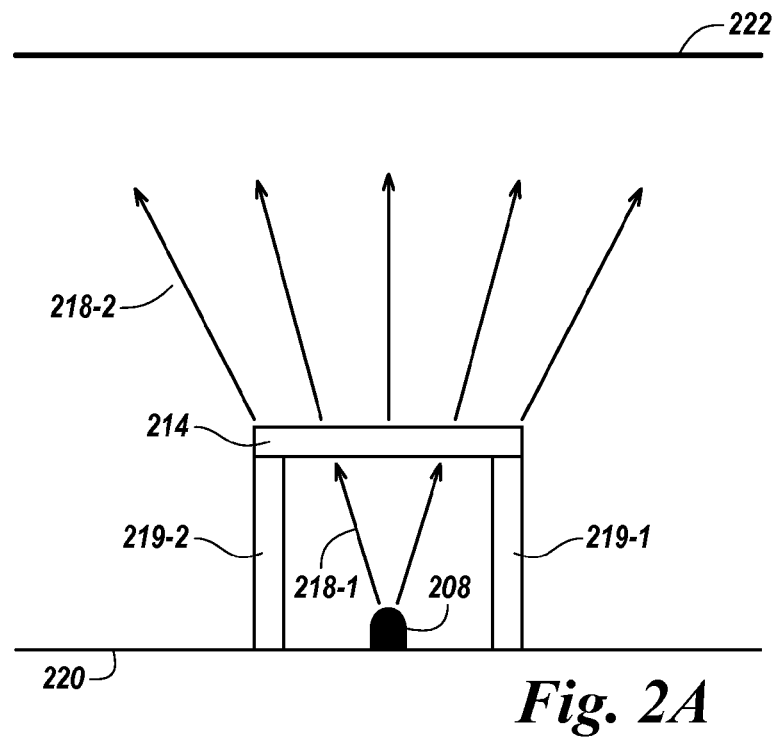
FIGS. 2A-B illustrate a planar diffusion plate and a hemispherical diffusion plate according to one or more embodiments of the present disclosure.
Figure 2B:
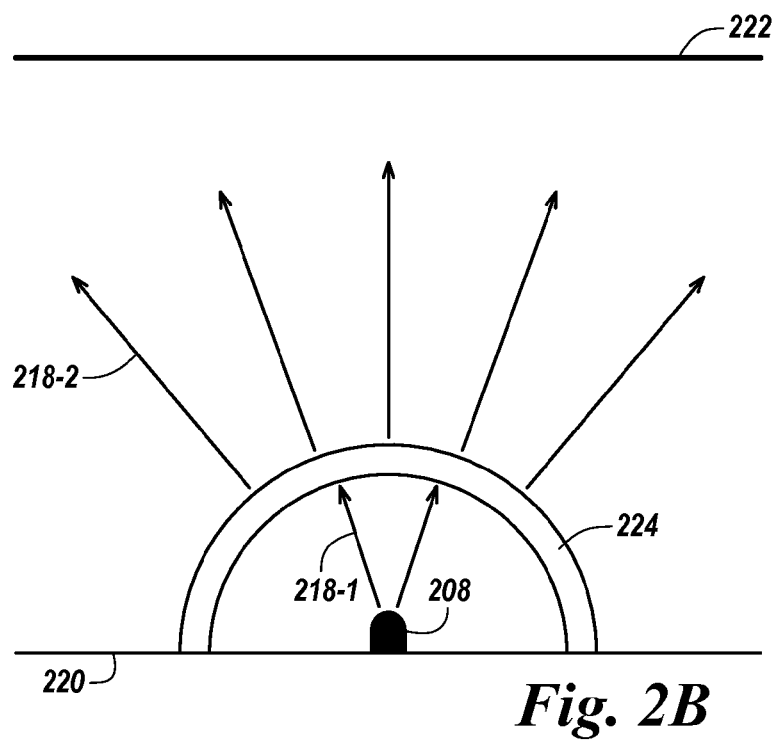

In some embodiments, a number of diffusion plates can be positioned between the frame 106 and the filter material 102. FIGS. 2A-B illustrate a planar diffusion plate and a hemispherical diffusion plate according to one or more embodiments of the present disclosure. Examples of a planar diffusion plate 214 and a hemispherical diffusion plate 224 are illustrated in FIGS. 2A-B. In an example, one or more planar diffusion plates 214 can be positioned between each LED 208 of the number of LEDs 208 and the filter material 222, as shown in FIG. 2A. Alternatively, and/or in addition, one or more planar diffusion plates 214 can be positioned between a plurality of LEDs 208 and the filter material 222. By positioning the planar diffusion plate 214 between the LED 208 and the filter material 222, an angle of divergence of the beam of light 218-1 emitted from the LED 208 can be increased. For example, when a beam of light 218-1 is emitted from the LED 208, the beam of light 218-1 can travel through the planar diffusion plate 214, which can diffuse the beam of light 218-1, forming a diffuse beam of light 218-2.

Planar diffusion plate 214 can be held in place between the LED 208 and the filter material 222 by securing the planar diffusion plate 214 to the frame 220. This can be accomplished by extending support members 219-1, 219-2 from the planar diffusion plate 214 to the frame 220. The support members 219-1, 219-2 can be formed as an integral part of the planar diffusion plate 214. For example, if the planar diffusion plate 214 is made from a plastic (e.g., poly(methyl methacrylate), polycarbonate), the planar diffusion plate 214 and support members 219-1, 219-2 can be one molded piece, which can be attached to the frame 220 by use of an adhesive and/or hardware fasteners (e.g., screws, tabs).

Alternatively, and/or in addition, support members can be separate structures attached to the planar diffusion plate 214 and the frame 220. By securing the diffusion plate 214 to the frame 220, the frame 220, the number of LEDs 208, and the number of planar diffusion plates 214 can form one unit that can be removed or inserted into the air filter.

Further, support members 219-1, 219-2 can be formed as one support member, for example, in the shape of a cylinder, which is attached to the frame 220 and the planar diffusion plate 214 such that the LED 208 is encased in an air tight chamber. In this manner, particulate matter passing through the frame 220 and past the LED 208 and the planar diffusion plate 214 will not accumulate on the LED and/or a surface of the planar diffusion plate 214 proximate to the LED 208.

In some embodiments, a number of planar diffusion plates 214 can be secured to one another to form an array of planar diffusion plates, which can be placed between the number of LEDs 208 and the filter material 222. In an example, the array of planar diffusion plates can be moved relative to the number of LEDs 208 to adjust an amount that the beams of light emitted by the number of LEDs 208 are diffused.

In various embodiments, one or more hemispherical diffusion plates 224 can be positioned between each LED 208 of the number of LEDs and the filter material 222, as shown in FIG. 2B. Alternatively, and/or in addition, one or more hemispherical diffusion plates 224 can be positioned between a plurality of LEDs and the filter material 222. By positioning the hemispherical diffusion plate 214 between the LED 208 and the filter material 222, the angle of divergence of the beam of light 218-1 can be increased (e.g., diffused beam of light 218-2). In a manner analogous to that discussed in relation to FIG. 2A, the hemispherical diffusion plate 224 can be attached to the frame 220 and/or secured to a plurality of hemispherical diffusion plates to form an array of hemispherical diffusion plates.

The beams of light 218-1, 218-2 can be further diffused by using a planar diffusion plate 214 and/or hemispherical diffusion plate 224 that includes diffusion structures formed on one or more surfaces of the planar diffusion plate 214. Diffusion structures can include prisms, protrusions, pores, and/or particles, for example, which are formed on a surface of a diffusion plate. In an example, the diffusion structures can be between a millimeter and a nanometer in size, although larger or smaller diffusion structures can be used. When a beam of light emitted from the LED 208 passes through a diffusion plate that has diffusion structures formed on the surface of the diffusion plate, the beam of light can be split into a plurality of light beams and/or deflected, thereby diffusing the beam of light.

Figure 3A:
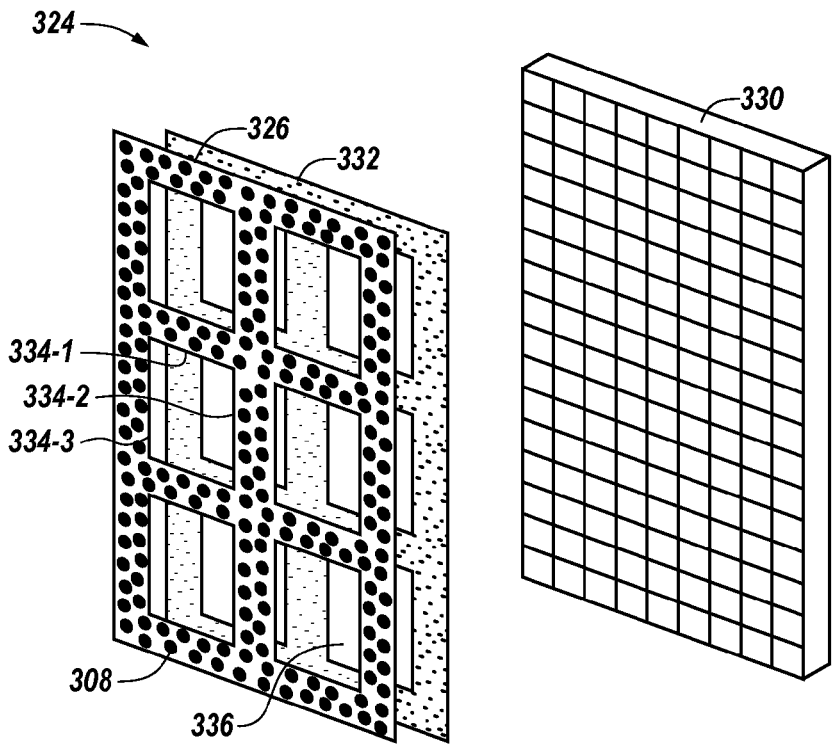
FIGS. 3A-B illustrate an LED activated photocatalyst air filter with a frame that includes a number of rows of LEDs, a filter material, and a diffusion plate according to one or more embodiments of the present disclosure.
Figure 3B:
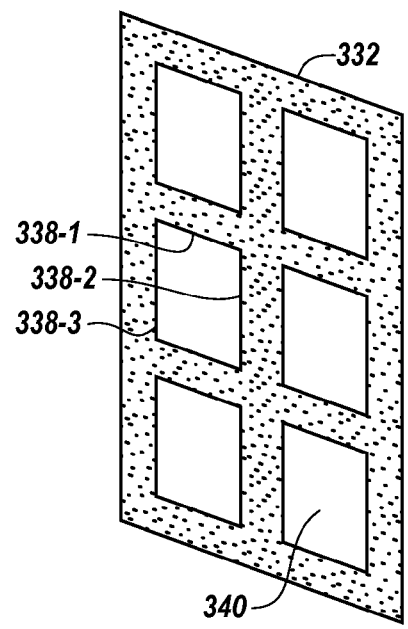

FIGS. 3A-B illustrate an LED activated photocatalyst air filter with a frame that includes a number of rows of LEDs, a filter material, and a diffusion plate according to one or more embodiments of the present disclosure. The LED activated photocatalyst air filter 324 can include a frame 326 that includes a number of cross members 334-1, 334-2, 334-3 and a number of vacancies 336 between the number of cross members. In some embodiments, the cross members can be planar cross members. For example, a first side of the cross members 334-1, 334-2, 334-3 proximate to the filter material 330 and a second side of the cross members 334-1, 334-2, 334-3 distal to the filter material 330 can be flat. Alternatively, and/or in addition, the first and/or second side of the cross members can be curved, which can, for example, help in reducing wind resistance on the frame 326 in some implementations.

In some embodiments, the LED activated photocatalyst air filter 324 can include an array of a number of LEDs 308 positioned on the frame 326, wherein the array of the number of LEDs 308 includes a number of rows of LEDs 308 affixed to each of the number of cross members 334-1, 334-2, 334-3 of the frame 326. In an example, the array of the number of LEDs 308 can include a plurality of rows of LEDs 308 affixed to each of the number of cross members 334-1, 334-2, 334-3 of the frame 326. In some such examples, the number of LEDs 308 can be affixed to a number of LED blocks, wherein the LED blocks include a number of LEDs affixed to a substrate such as a printed circuit board. The LED blocks can then be attached to each of the number of cross members 334-1, 334-2, 334-3 of the frame 326. Alternatively, and/or in addition, the frame 326 can be made from a printed circuit board.

By affixing the plurality of rows of LEDs 308 to each of the number of cross members 334-1, 334-2, 334-3 of the frame 326, a higher density of LEDs 308 per area may be provided, thus causing an increase in luminous flux (e.g., the energy transferred in the form of visible radiation) produced by the array of the number of LEDs 308. By increasing the luminous flux produced by the array of the number of LEDs 308, a speed at which the photocatalyst reacts can increase. This can cause an increase in a number of hydroxyl radicals and super-oxide ions that are available to react with and oxidize VOCs.

In various embodiments, the luminous flux of the array of LEDs 308 can be variable. In an example, a fraction of the number of LEDs 308 in the array can be turned off, thus varying the luminous flux of the array. Alternatively, and/or in addition, a number of variable resistors can be connected to the array of LEDs 308 to control a current/voltage applied to the array of LEDs 308. In an example, the current/voltage applied to each of the number of LEDs 308 in the array can be substantially uniform. Alternatively, and/or in addition, the current/voltage can be varied for individual LEDs 308 and/or a fraction of the number of LEDs 308.

Increasing the current/voltage to the array of LEDs 308 can cause the luminous flux produced by the array of LEDs 308 to increase, thus causing an increase in the number of hydroxyl radicals and super-oxide ions that are available to react with and oxidize VOCs. By decreasing the current/voltage to the array of LEDs 308, the luminous flux produced by the array of LEDs 308 can be decreased, thus causing a decrease in the number of hydroxyl radicals and super-oxide ions available to react with and oxidize VOCs.

The LED activated photocatalyst air filter 324 can include a filter material 330 including a photocatalyst positioned a distance from the array of LEDs 308. In various embodiments, the distance between the filter material 330 and the array of LEDs 308 can be adjustable. Adjusting the distance between the filter material 330 and the array of LEDs 308 can be accomplished by moving the filter material 330 and/or the array of LEDs 308 closer and/or further apart from one another. In an example, the filter material 330 and/or the array of LEDs 308 can be mounted on a number of tracks and can be moved manually and/or by an actuator, for example.

By adjusting the distance between the array of LEDs 308 and the filter material 330, UV and/or visible light irradiance can be adjusted. Irradiance can be defined as a density of radiation incident on a given surface (e.g., filter material, photocatalyst). In an example, increasing the distance between the array of LEDs 308 and the filter material 330 can decrease UV and/or visible light irradiance on the photocatalyst. In contrast, decreasing the distance between the array of LEDs 308 and the filter material 330 can increase UV and/or visible light irradiance on the photocatalyst. As a result, the speed at which the photocatalyst reacts can increase and/or decrease depending on the UV and/or visible light irradiance on the photocatalyst. This can increase and/or decrease the number of hydroxyl radicals and super-oxide ions that are available to react with and oxidize VOCs.

In some embodiments, the LED activated photocatalyst air filter 324 can include a number of VOC sensors connected to a computer, which can, in turn, be connected with the actuator and/or variable resistor. The VOC sensor can be installed before and/or after the LED activated photocatalyst air filter 324, for example in an air duct, and can determine a concentration and/or type of VOC entering the air filter and/or leaving the air filter 324. Based on the concentration and/or type of VOC, the computer can adjust the luminous flux of the array of LEDs (e.g., by adjusting the voltage/current applied to the array of LEDs) and/or the irradiance on the photocatalyst (e.g., by adjusting the distance between the array of LEDs and the filter material, adjusting the luminous flux). Accordingly, the amount of hydroxyl radicals and super-oxide ions generated can be adjusted.

The LED activated photocatalyst air filter 324 can include positioning a diffusion plate 332 between the array of LEDs 308 and the filter material 330 including the photocatalyst, wherein the diffusion plate 332 can include a number of cross members 338-1, 338-2, 338-3 of the diffusion plate 332 with vacancies 340 between the number of cross members 338-1, 338-2, 338-3 that correspond with the vacancies 336 between the number of cross members 334-1, 334-2, 334-3 of the frame 326. In an example the diffusion plate 332 can be one piece formed from a piece of plastic (e.g. poly(methyl methacrylate), polycarbonate). In some embodiments, the diffusion plate 332 can include a lip around a perimeter of the diffusion plate 332 and each of the vacancies 338-1, 338-2, 338-3, such that the lip of the diffusion plate 332 fits over the plurality of LEDs 308 and abuts the frame 326, a substrate that the plurality of LEDs are affixed to, and/or gasket; thus encasing the LEDs in an air tight chamber.

In some embodiments, a surface of the diffusion plate 332 can include diffusion structures to provide diffusion of the beams of light emitted from the plurality of LEDs 308. As discussed herein, the diffusion structures can include prisms, protrusions, pores, and/or particles, for example, that are formed on one or more surfaces of the diffusion plate.

In various embodiments, a first side and/or portions of the first side of diffusion plate 332 proximate to filter material 330 can be curved in a convex and/or concave manner, which can provide diffusion of the beams of light emitted from the plurality of LEDs 308. Alternatively, and/or in addition, a second side and/or portions of the second side of diffusion plate 332 distal to filter material 330 can be curved in a convex and/or concave manner. Alternatively, and/or in addition, diffusion plate 332 can be planar.

Figure 4:
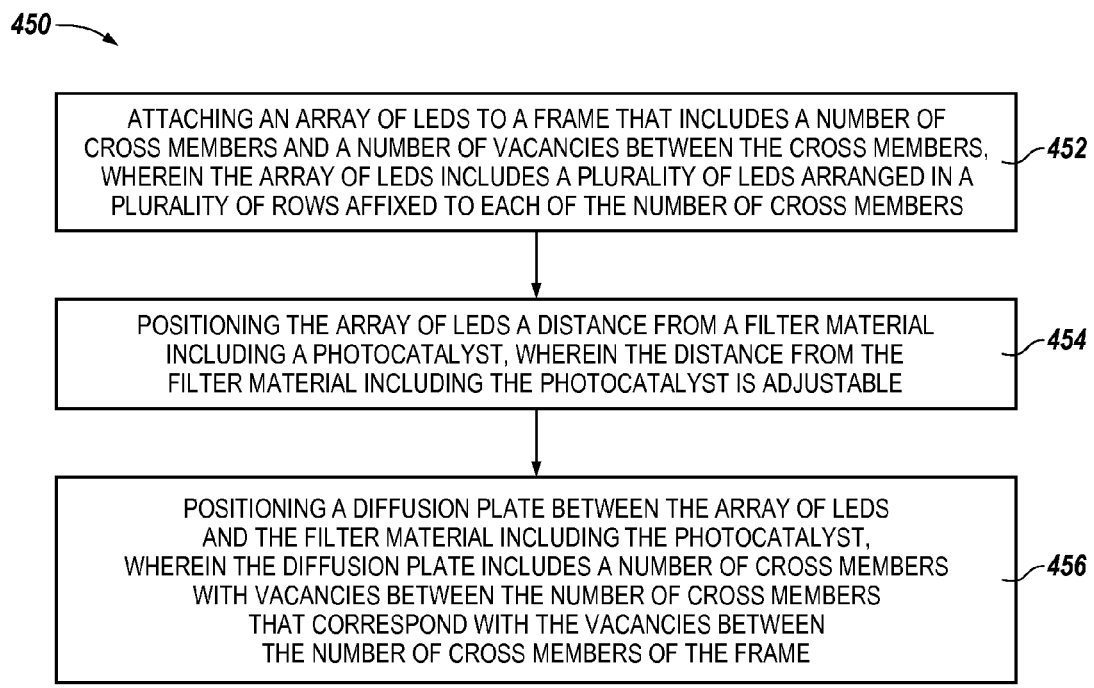
FIG. 4 illustrates a method for making an LED activated photocatalyst air filter according to one or more embodiments of the present disclosure.

FIG. 4 illustrates a block diagram illustrating an example of a method for making an LED activated photocatalyst air filter according to one or more embodiments of the present disclosure. The method 450 includes attaching an array of LEDs to a frame that includes a number of cross members and a number of vacancies between the cross members, wherein the array of LEDs includes a plurality of LEDs arranged in a plurality of rows affixed to each of the number of cross members, at block 452. In an example, attaching the array of LEDs to the frame includes attaching a number of LED blocks to the frame, wherein each LED block contains a plurality of LEDs arranged in a plurality of rows.

The method 450 includes positioning the array of LEDs a distance from a filter material including a photocatalyst, wherein the distance from the filter material including the photocatalyst is adjustable, at block 454. In an example, the distance between the diffuse LED array and the filter material can be adjusted in response to a concentration of a VOC passing through the LED activated photocatalyst air filter. Alternatively, and/or in addition, the luminous flux of the LED array can be adjusted to activate the photocatalyst in response to a concentration of a VOC passing through the LED activated photocatalyst air filter. The method 450 includes positioning a diffusion plate between the array of LEDs and the filter material including the photocatalyst, wherein the diffusion plate includes a number of cross members with vacancies between the number of planar cross members that correspond with the vacancies between the number of cross members of the frame, at block 456.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A light emitting diode (LED) activated photocatalyst air filter, comprising:
   a filter material that includes a photocatalyst;
   a frame that includes an array of a number of LED blocks positioned on the frame, wherein each of the number of LED blocks includes a plurality of LEDs arranged in a plurality of rows positioned a distance from the filter material, and wherein the plurality of LEDs project a wavelength of light directed toward the filter material; and
   a track configured to allow movement of at least one of the filter material and the frame such that the distance is adjustable.

2. The LED activated photocatalyst air filter of claim 1, wherein the filter material is at least one of coated and embedded with the photocatalyst.

3. The LED activated photocatalyst air filter of claim 1;
   wherein the frame includes a number of cross members with vacancies between the number of cross members, and
   wherein the plurality of rows of LEDs are positioned on each of the number of cross members of the frame.

4. The LED activated photocatalyst air filter of claim 1, wherein the frame is a mesh and wherein the number of LED blocks are positioned at a number of intersections of the mesh.

5. The LED activated photocatalyst air filter of claim 1, wherein the photocatalyst is selected from the group consisting of titanium dioxide, zinc oxide, ferric oxide, cadmium sulfide, cadmium selenide, tungsten trioxide, molybdenum trioxide, vanadium pentoxide, tin oxide, and combinations thereof.

6. The LED activated photocatalyst air filter of claim 1, wherein the LED activated photocatalyst air filter includes:
   a sensor configured to determine a concentration of a volatile organic carbon passing through the LED activated photocatalyst air filter, and wherein the distance is adjustable in response to the concentration of the volatile organic carbon passing through the LED activated photocatalyst air filter.

7. The LED activated photocatalyst air filter of claim 1, wherein the LED activated photocatalyst air filter includes:
   a sensor configured to determine a concentration of a volatile organic carbon passing through the LED activated photocatalyst air filter; and
   a variable resistor connected to the sensor and configured to adjust a luminous flux of the number of LED blocks in response to the determined concentration of the volatile organic carbon passing through the LED activated photocatalyst air filter.

* * * * *